United States Patent
Miller

(10) Patent No.: US 8,862,356 B2
(45) Date of Patent: Oct. 14, 2014

(54) REGENERATIVE BRAKE SYSTEM RESET FEATURE AND ADAPTIVE CALIBRATION FOR HYBRID AND ELECTRIC VEHICLES

(75) Inventor: Stanton E. Miller, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 27 days.

(21) Appl. No.: 13/581,103

(22) PCT Filed: Mar. 2, 2010

(86) PCT No.: PCT/US2010/025886
§ 371 (c)(1),
(2), (4) Date: Aug. 24, 2012

(87) PCT Pub. No.: WO2011/109013
PCT Pub. Date: Sep. 9, 2011

(65) Prior Publication Data
US 2012/0325573 A1    Dec. 27, 2012

(51) Int. Cl.
| B60T 8/1755 | (2006.01) |
| B60T 8/17 | (2006.01) |
| B60L 11/14 | (2006.01) |
| B60L 7/24 | (2006.01) |
| C03C 25/24 | (2006.01) |
| C10M 107/00 | (2006.01) |

(52) U.S. Cl.
CPC ............ *B60L 11/14* (2013.01); *C10M 2205/16* (2013.01); *C10M 2215/04* (2013.01); *C10M 2205/14* (2013.01); *C10N 2270/00* (2013.01); *C10M 2217/044* (2013.01); *B60L 7/24* (2013.01); *C10M 2215/26* (2013.01); *C10N 2250/08* (2013.01); *C03C 25/243* (2013.01); *C10M 2217/045* (2013.01); *C10M 2205/17* (2013.01); *C10N 2250/10* (2013.01); *C10M 2209/04* (2013.01); *Y02T 10/7077* (2013.01); *C10M 2217/046* (2013.01); *C10M 2209/06* (2013.01); *C10M 2209/062* (2013.01); *C10N 2250/121* (2013.01); *C10M 2209/12* (2013.01); *C10M 2217/06* (2013.01); *C10M 7/00* (2013.01); *C10N 2240/62* (2013.01); *Y10S 903/947* (2013.01)

USPC ....... 701/70; 180/282; 180/65.285; 180/65.1; 180/65.22; 903/947

(58) Field of Classification Search
CPC .................................. B60L 7/24; B60L 11/14
USPC ........... 701/70; 180/65.1, 65.22, 65.285, 165, 180/282; 903/947
See application file for complete search history.

(56) References Cited

U.S. PATENT DOCUMENTS

| 4,962,969 A | 10/1990 | Davis |
| 6,086,166 A | 7/2000 | Fukasawa |

(Continued)

FOREIGN PATENT DOCUMENTS

| WO | 2009077835 A1 | 6/2009 |
| WO | 2011109013 A1 | 9/2011 |

OTHER PUBLICATIONS

International Preliminary Report on Patentability dated Sep. 24, 2012 from parent application, WO2011/109013.

*Primary Examiner* — Thomas G Black
*Assistant Examiner* — Wae Louie
(74) *Attorney, Agent, or Firm* — Jeffrey P. Calfa; Mark C. Bach

(57) ABSTRACT

In a vehicle equipped for regenerative and non-regenerative braking, regenerative braking only is applied to predetermined wheels in response to braking demand when the driver attempts to slow the vehicle at a first rate ($<D_1$ ft/sec$^2$), no wheel locking on any braking wheel as indicated by an antilock braking system controller and speed exceeds a minimum threshold. If braking is applied in a turn, appropriate amount of non-drive wheel service/foundation brake torque to maintain vehicle stability is applied. The appropriate amount of foundation braking to be applied is determined by the amount of vehicle yaw, steering wheel input and vehicle speed by using a look-up table. As braking demand increases foundation/service braking is added, first to any wheels not providing for regenerative braking and later to wheels having regenerative braking.

26 Claims, 8 Drawing Sheets

(56) References Cited

U.S. PATENT DOCUMENTS

| | | | |
|---|---|---|---|
| 6,644,427 B2 * | 11/2003 | Schulte | 180/65.25 |
| 6,691,013 B1 * | 2/2004 | Brown | 701/70 |
| 6,697,727 B2 * | 2/2004 | Miller et al. | 701/70 |
| 6,719,080 B1 | 4/2004 | Gray, Jr. | |
| 6,847,189 B2 | 1/2005 | Frank | |
| 7,093,912 B2 * | 8/2006 | Brown et al. | 303/146 |
| 7,426,975 B2 * | 9/2008 | Toyota et al. | 180/165 |
| 7,689,341 B2 * | 3/2010 | Miller | 701/70 |
| 2004/0108771 A1 * | 6/2004 | Tsunehara | 303/155 |
| 2005/0159871 A1 * | 7/2005 | Nakamura et al. | 701/70 |
| 2009/0139788 A1 * | 6/2009 | Miller | 180/165 |
| 2010/0125398 A1 * | 5/2010 | Headlee et al. | 701/71 |
| 2010/0324766 A1 * | 12/2010 | Linda et al. | 701/22 |
| 2012/0059538 A1 * | 3/2012 | Morris | 701/22 |
| 2012/0262102 A1 * | 10/2012 | Gee et al. | 318/448 |
| 2012/0325573 A1 * | 12/2012 | Miller | 180/282 |
| 2013/0317681 A1 * | 11/2013 | Bissontz | 701/22 |

* cited by examiner

REGENERATIVE BRAKE SYSTEM RESET FEATURE AND ADAPTIVE CALIBRATION FOR HYBRID AND ELECTRIC VEHICLES

BACKGROUND

1. Technical Field

The technical field relates generally to vehicles providing for recapture of vehicle kinetic energy during braking and, more particularly, to control over blending of regenerative and non-regenerative braking on a vehicle to increase the proportion regenerative braking contributes to total braking, consistent with leaving directional control over the vehicle substantially unaffected.

2. Description Of The Problem

Many vehicles, including vehicles which provide for recapture of vehicle kinetic energy during braking (regenerative braking) provide such regenerative braking through the vehicle's drive wheels. In many cases this allows components of the vehicle drive train to function as a mechanism for energy recapture. For example, an internal combustion engine can be back driven from the drive wheels to operate as an air compressor. When operating as a compressor, the internal combustion engine draws intake air into its cylinders and compresses the air for delivery to a compressed air storage tank. Another possibility is a hydraulic hybrid which recovers kinetic energy by using a hydraulic motor connected to the drivetrain as a pump during braking and storing the fluid in a pressurized vessel. Alternatively, an electric traction motor can be back driven to operate as an electrical generator to charge a storage battery. Still other options include spinning up flywheels to store energy. Often these vehicles are not all wheel drive, meaning the vehicle drive train for such vehicles is connected to either the rear wheels, or the front wheels, but not both. As a consequence, often only the rear or front wheels of the vehicle are available for regenerative braking. On vehicles with less than all-wheel drive, the non-regenerative service/foundation brakes on each of the wheels frequently supplement vehicle braking, although this occurs primarily through the non-drive wheels.

Supplementing regenerative braking with non-regenerative service brake usage on a vehicle having less than all wheel drive serves a number of functions including providing predictable control over the vehicle, particularly if in a turn, by balancing the braking action among the wheels. Balanced braking usually aims at providing braking torque on each axle which is proportional to the weight carried by the axle. This provides control over vehicle yaw. However, the greater the non-regenerative braking torque provided, the smaller the quantity of energy recaptured for storage. Balanced braking can reduce energy recapture.

Under light or minimal braking, the difficulties posed by unbalanced braking are diminished. As a consequence, it is common to have a brake pedal "dead band" over a portion of the brake pedal travel from a fully undepressed position to a partially depressed position. In this dead band region, only regenerative braking is used. Service/foundation brakes are used to supplement regenerative braking as brake pedal travel increases. Vehicle weight changes and vehicle configuration changes can complicate application of this approach.

Regenerative braking is most commonly associated with hybrid-electric and electric vehicles. It is also found in vehicles providing for storing energy as hydraulic/pneumatic pressure and in a spinning flywheel, among other techniques. While it is anticipated that the present teachings will most often find application in vehicles having less than all-wheel drive and that typically regenerative braking will be provided through the drive wheels on such vehicles, it is not necessarily so limited.

SUMMARY

In vehicles providing both regenerative and non-regenerative braking, and particularly those providing for regenerative braking from less than all of the wheels, regenerative braking only is applied in response to braking demand when the driver attempts to slow the vehicle at less than a maximum threshold deceleration ($d<D_1$ ft/sec$^2$), with no wheel locking occurring on any braking wheel as indicated by an anti-lock braking system controller and vehicle speed exceeds a minimum threshold speed ($v>V_1$ ft/sec). If braking is applied in a turn, a yaw sensor and steering wheel position sensor indicate that the vehicle is in a turn and brake control applies an appropriate amount of non-drive wheel service/foundation brake torque to maintain vehicle stability. The appropriate amount of foundation braking to be applied is determined by the amount of vehicle yaw, steering wheel input and vehicle speed by using a look-up table. As braking demand increases, foundation/service braking is added to both non-drive wheels and drive wheels so that proper vehicle yaw control is maintained, as determined by a vehicle yaw control algorithm.

Emphasizing regenerative braking on the drive wheels may result in deferred burnishing of the foundation/service brakes when the vehicle is new, or after brake linings/pads have been replaced. (Federal Motor Vehicle Safety Standards FMVSS 105, 121, and 135 detail brake burnishing procedures). When the vehicle is new or after brake linings are replaced, braking operation includes a "reset function or mode" in which regenerative braking is reduced or eliminated. When the regenerative braking reset mode has been initiated, the vehicle uses minimal regenerative braking during a foundation brake break-in period. The break in period may be measured in units of distance, by the number of brake applications, in terms of brake swept area times brake application pressure, or some combination that would be indicative of the foundation brake linings having been burnished. The specific calibration should be determined through vehicle testing on a given vehicle type. Once the brakes are indicated as properly burnished, the vehicle will revert to normal regenerative braking function. Alternatively, instead of going from a single minimal regenerative braking apply point to normal regenerative apply once outlined conditions have been met, regenerative braking level may be increased during this brake lining burnishing period on a progressive basis.

It is possible to build a vehicle which provides regenerative braking for only the non-drive wheels (or a regenerative braking system which is not incorporated into the drive train but which operates on the drive wheels or off the drive train). It is also possible to use a mix of regenerative and non-regenerative braking on a non-motorized vehicle such as a trailer. Various aspects of the present teachings have application to all wheel drive vehicles. The reset function would also apply to vehicles that recapture energy from multiple drive and non-drive axles. Vehicles that do not have regenerative braking, but which use a feature such as the Jacobs compression brake (Jake brake) could also benefit from the reset function, as use of a Jake brake can greatly reduce the amount of foundation braking required to slow or stop the vehicle.

DETAILED DESCRIPTION

Figure 1:
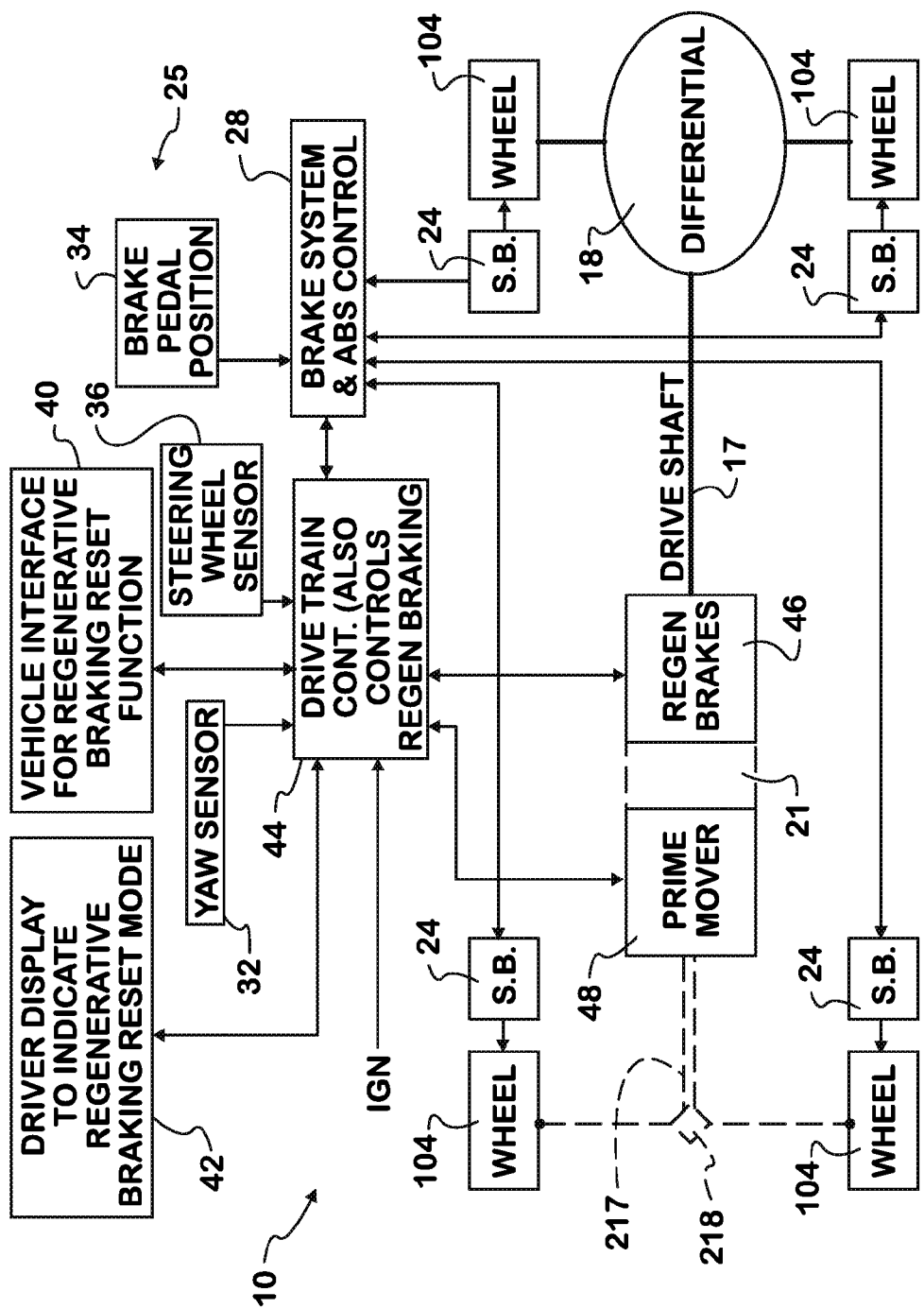
FIG. 1 is a high level schematic of a vehicle traction and braking system.

In the following detailed description, like reference numerals and characters may be used to designate identical, corresponding, or similar components in differing drawing figures. Furthermore, exemplary sizes, models, values, or ranges may be given with respect to specific embodiments but are not to be considered generally limiting. The principals taught here can be extended to a variety of vehicles using regenerative braking in general, and some specific aspects of the teachings can be applied to vehicles supplementing foundation braking using devices such as driveline retarders, like those manufactured by Telma or engine compression brakes, like those manufactured by Jacobs.

Referring now to the figures and in particular to FIG. 1, a generalized vehicle 10 is illustrated which provides the possibility of mixed regenerative (using regenerative braking transducer and regenerative brakes 46) and non-regenerative braking (using service brakes 24). Regenerative brakes 46 are coupled to a pair of wheels 104 by a drive shaft 17 and drive axle differential 18, and are applied to fewer than all of the vehicle wheels 104. Alternatively, regenerative brakes 46 may be directly connected to wheels 104. Service brakes 24 may be used with up to all of wheels 104. The service brakes 24 are under the control of a brake system and anti-lock brake system controller 28. Regenerative brakes 46 are under the control of a drive train controller 44. Braking occurs in response to a braking demand signal generated by a brake pedal position/force sensor 34. A yaw sensor 32 and an optional steering wheel position sensor 36 (if the vehicle is steering wheel equipped, alternatively, a sensor could be substituted such as a fifth wheel rotation sensor) are used to determine if the vehicle 10 is in a turn. A vehicle interface 40 can be provided for placing vehicle 10 in regenerative braking reset mode and a driver display 42 may be provided indicating to an operator that the vehicle 10 is in reset mode.

Vehicle 10 may be a powered vehicle in which case a prime mover 48, shown under the control of a drive train controller 44, may be provided. Prime mover 48 may be coupled by a drive shaft 17 to a drive axle differential 18 to drive some combination wheels 104. Alternatively, prime mover 48 may be linked by an auto-clutch 21 through the regenerative brakes 46 to drive axle differential 18. In some embodiments, prime mover 48 and regenerative brakes 46 may be the same device operating in different modes. For example, an electric traction motor can operate as an electric generator, or a flywheel can be tapped for energy, thus slowing it down, or it can be spun up to absorb energy. As a further alternative, an internal combustion engine can operate as an air pump to provide non-service brake braking torque, as is done in a Jacobs compression brake, or in a system wherein the engine is operated to pump air into a reservoir. Also, using an exhaust turbine as a power source may work for mild hybrid systems.

Figure 2:
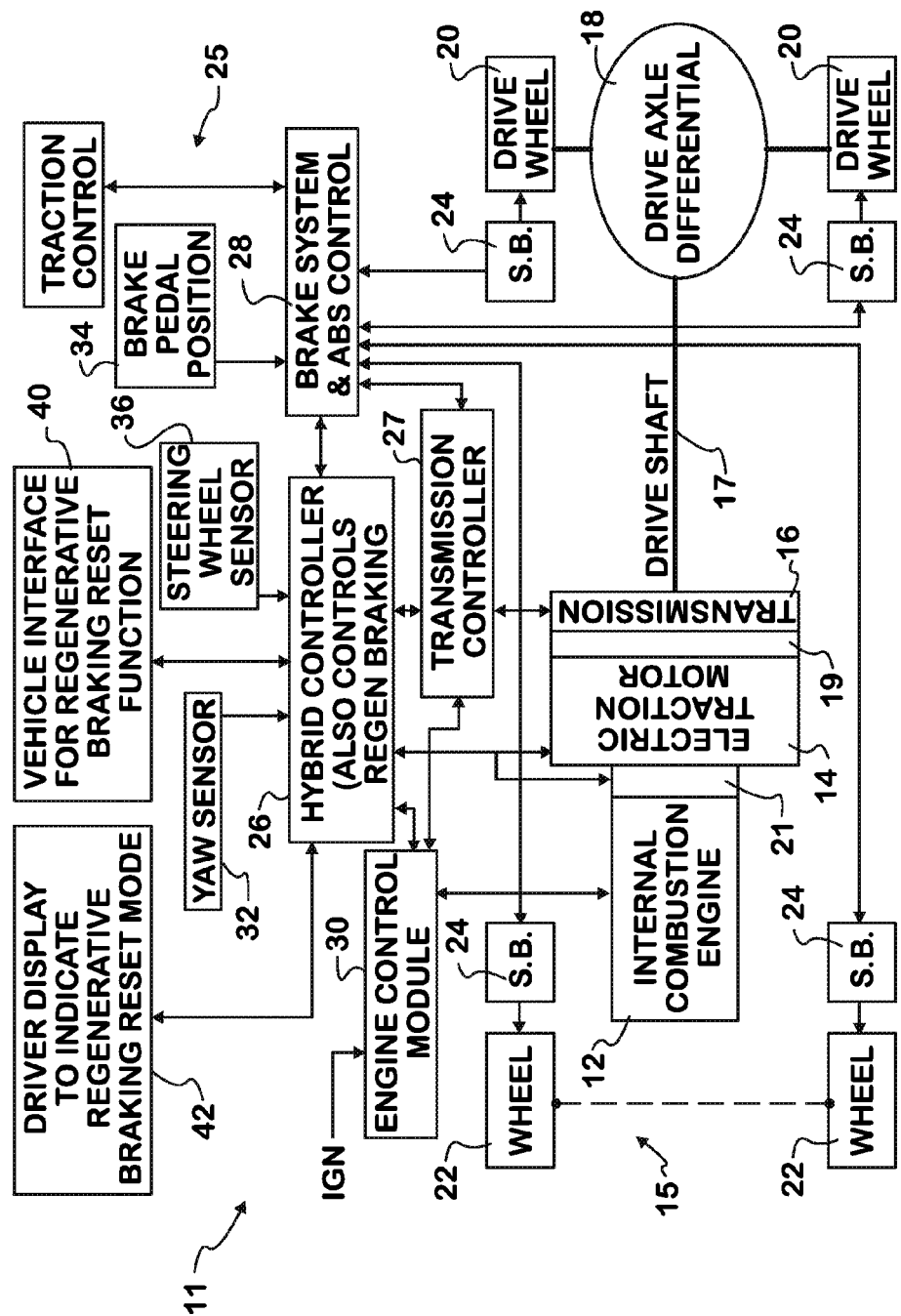
FIG. 2 is a block diagram of a vehicle traction and braking system and associated controls for a hybrid-electric vehicle.

Referring now to FIG. 2, the general principals of the vehicle in FIG. 1 are applied to a parallel hybrid-electric vehicle 11. Parallel hybrid-electric vehicle 11 includes a drive train 15 including a thermal engine 12 (typically an internal combustion engine), an electric traction motor/generator 14, a transmission 16, a drive shaft 17, a drive axle differential 18, and a pair of drive wheels 20. An auto-clutch 21 may be located between the electric traction motor/generator 14 and the thermal engine 12. Thermal engine 12 or electric traction motor/generator 14 may be used as the vehicle's prime mover through transmission 16. Transmission 16 is connected to a drive axle differential 18 by a drive shaft 17. Power is transmitted from the drive axle differential 18 to drive wheels 20. Essentially the same configuration may be used for an electric vehicle simply by removing the thermal engine 12, the auto-clutch 21, and the engine controller 30. An optional clutch 19 may be positioned between transmission 16 and the electric traction motor/generator 14 if a manual transmission is used.

Auto-clutch 21 allows disconnection of the thermal engine 12 from the rest of the drive train 15 when the thermal engine 12 is not being used for motive power. Auto-clutch 21 may be engaged and clutch 19 disengaged to use the thermal engine 12 to drive the electric traction motor/generator 14 to recharge the vehicle batteries (not shown). Alternatively, transmission 16 may simply be placed out of gear. Transmission 16 is in turn used to apply power from the electric traction motor/generator 14 to drive wheels 20. Transmission 16 is bi-directional and can be used to transmit energy from the drive wheels 20 back to the electric traction motor/generator 14. Electric traction motor/generator 14 may be used to provide motive energy (either alone or in cooperation with the thermal engine 12) to transmission 16.

Drive train 15 provides for the recapture of kinetic energy (regenerative braking) in response to the electric traction motor/generator 14 being back driven by the vehicle's kinetic energy. Electric traction motor/generator 14, during braking, generates electricity which is applied to storage batteries (not shown) through an inverter (not shown). In addition to regenerative braking, parallel hybrid-electric vehicle 11 provides for foundation braking using service brakes 24 on the drive wheels 20 and the non-drive wheels 22.

A simplified control system 25 for parallel hybrid-electric vehicle 11 is illustrated relating to the control aspects used with the drive train 15 and vehicle braking and for adapting the vehicle for thermal engine 12 traction, electric traction motor/generator 14 traction and regenerative braking using electric traction motor/generator 14 in its generator or regenerative mode. Service brakes 24 are under the direct control of a brake system and anti-lock brake system controller 28 which, for non-generative operation, is responsive to a brake pedal position/force sensor 34 and to feedback from wheel motion sensors (not shown) for controlling braking torque. Operation of brake system and anti-lock brake system controller 28 is modified by signals from the hybrid controller 26. A traction controller 38 may also be present, responsive to detection of skidding of wheels 20 when no displacement of the brake pedal is detected by the brake pedal position/force sensor 34.

Simplified control system 25 includes a hybrid controller 26 coupled for communication and control of the electric traction motor/generator 14 and auto-clutch 21. The transitions between positive and negative electric traction motor/generator 14 torque contributions are detected and managed by a hybrid controller 26 which allows shifting operation. Hybrid controller 26 exchanges data with a brake system and anti-lock brake system controller 28 to determine if regenerative braking would increase or enhance a wheel slippage condition if regenerative braking were initiated. Transmission controller 27 translates these data as control signals for application to hybrid controller 26. Hybrid controller 26 operates cooperatively with brake system and anti-lock brake system controller 28 for blending regenerative braking and non-regenerative braking. Because brake blending depends upon vehicle operating conditions, hybrid controller 26 is connected to a yaw sensor 32 and a steering wheel position sensor 36, data from which can vary the balance of regenerative and non-regenerative braking Vehicle speed can be sourced from a conventional drive shaft tachometer or from the brake system and anti-lock brake system controller 28.

Simplified control system 25 also includes an engine controller 30 which is connected for the control and monitoring of thermal engine 12 and which operates as a conventional engine controller in a hybrid system by providing for thermal engine 12 cutoff during periods when the parallel hybrid-electric vehicle 11 is operating on battery power. Engine controller 30 also monitors the position of and cycles from off to on of an ignition switch (IGN).

Braking control for parallel hybrid-electric vehicle 11 affords adjusting brake application response based on brake condition. More particularly, when a vehicle is new or brake linings and pads are freshly replaced a burnishing period is provided during which regenerative braking is reduced. A vehicle interface 40 coupled to the hybrid controller is provided for service personnel, which allows them to reset/initialize the burnishing period. The vehicle interface 40 is a reset function which should not be easy to inadvertently initiate. Regenerative braking reset function may be initiated by holding down two otherwise unrelated control buttons simultaneously for a specific period of time, through a plug-in piece of vehicle diagnostic or service equipment, or yet some other arbitrary input source.

Figure 3:
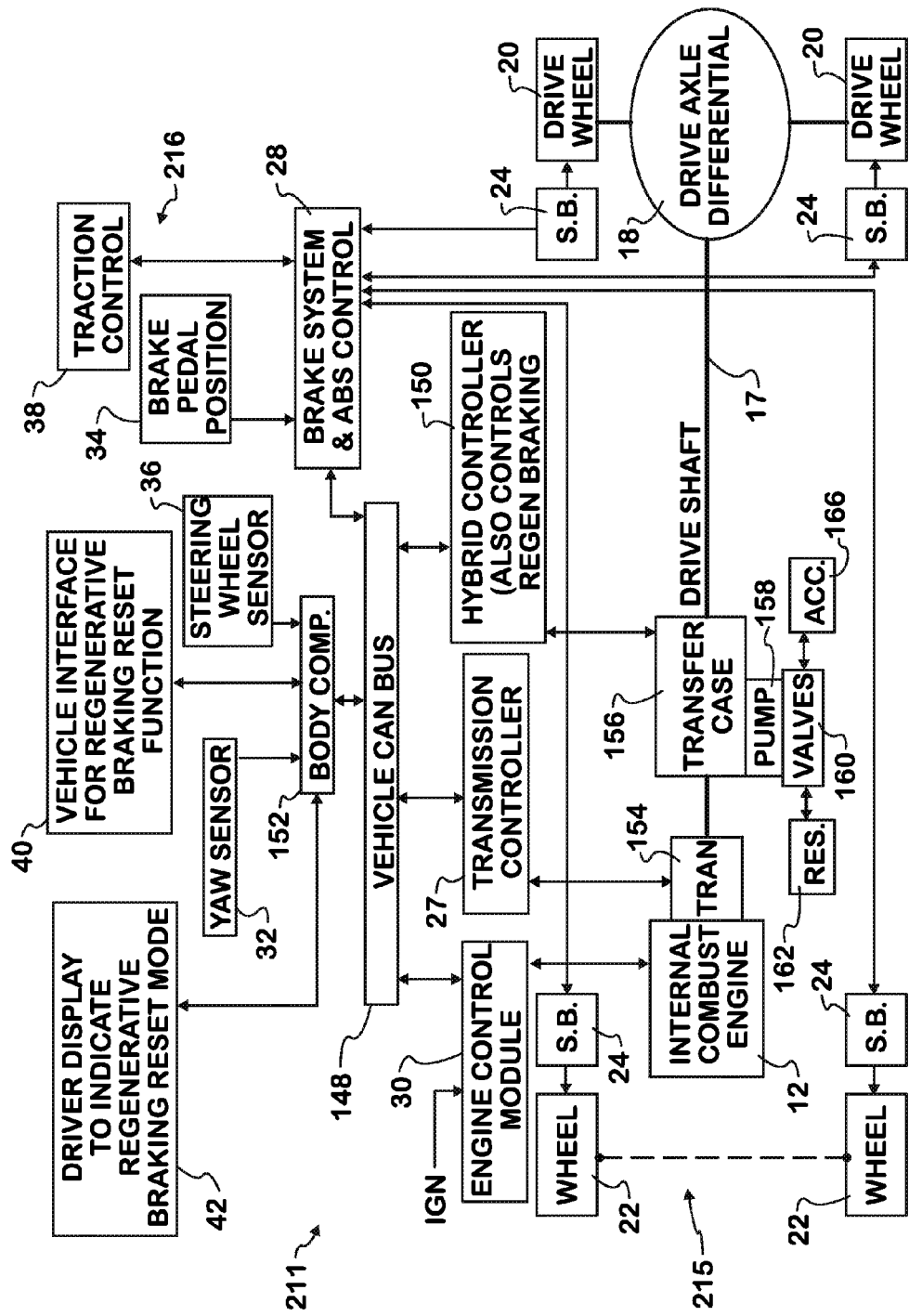
FIG. 3 is a block diagram of a vehicle traction and braking system and associated controls for a hydraulic hybrid vehicle.

Referring now to FIG. 3, a functional block diagram for a parallel hydraulic hybrid vehicle 211, parallel hydraulic hybrid vehicle 211 includes a drive train 215 comprising a thermal engine 12 (typically an internal combustion engine), a transmission 154, a drive shaft 164, a transfer case and clutch 156, a second drive shaft 17 leading to a drive axle differential 18. Transfer case and clutch 156 is mechanically coupled to a hydraulic pump/motor 158. Hydraulic pump/motor 158 may be selectively connected between a low pressure hydraulic fluid reservoir 162 and a high pressure hydraulic fluid accumulator 166 by a system of valves 160.

Transfer case and clutch 156 allows for the disconnection of the thermal engine 12 from the drive axle differential 18 and further allows the transfer case and clutch 156 to be back driven to operate hydraulic pump/motor 158 to transfer hydraulic fluid from low pressure hydraulic fluid reservoir 162 to high pressure hydraulic fluid accumulator 166 during braking Alternatively, transfer case and clutch 156 may connect thermal engine 12 (through transmission 154) to drive axle differential 18 to supply motive power to the drive axle. System of valves 160 may be set to allow hydraulic fluid to pass from the high pressure hydraulic fluid accumulator 166 through the hydraulic pump/motor 158 to low pressure hydraulic fluid reservoir 162 to add torque to drive shaft 17 for driving the parallel hydraulic hybrid vehicle 211. It is also possible for the parallel hydraulic hybrid vehicle 211 to be powered exclusively by hydraulic fluid from the high pressure hydraulic fluid accumulator 166 without thermal engine 12 support.

Drive train 215 provides for the recapture of kinetic energy (regenerative braking) in response to the hydraulic pump/motor 158 being back driven by the vehicle's kinetic energy. Hydraulic pump/motor 158, during braking, moves hydraulic fluid from the low pressure hydraulic fluid reservoir 162 to the high pressure hydraulic fluid accumulator 166. Foundation braking using service brakes 24 on the drive wheels 20 and the non-drive wheels 22 is also available.

A simplified control system 216 for parallel hydraulic hybrid vehicle 211 is illustrated. The vehicle control backbone is a vehicle controller area network bus 148 over which various controllers communicate with one another. Vehicle integration is handled by a body computer 152, which in this embodiment directly supports driver display 42 and vehicle interface 40 involved with the regenerative brake reset mode. In addition, the yaw sensor 32 and steering wheel position sensor 36 are connected to the body computer 152. Service brakes 24 are under the direct control of a brake system and anti-lock brake system controller 28 which, for non-generative operation, is responsive to a brake pedal position/force sensor 34 and to feedback from wheel motion sensors (not shown) for controlling braking torque generated by the service brakes 24. Operation of brake system and anti-lock brake system controller 28 is modified by signals from the hydraulic hybrid controller 150 over vehicle controller area network bus 148. A traction controller 38 may also be present responsive to detection of skidding of wheels 20 when no displacement of the brake pedal is detected by the brake pedal position/force sensor 34.

Simplified control system 216 includes a hydraulic hybrid controller 150 coupled for communication and control of the transfer case and clutch 156 and for opening and closing system of valves 160. The transitions between positive and negative torque contributions by hydraulic pump/motor 158 are detected and managed by the hydraulic hybrid controller 150 which resets system of valves 160 in response thereto and engages and disengages the clutch in transfer case and clutch 156. Hydraulic hybrid controller 150 exchanges data with a brake system and anti-lock brake system controller 28 over vehicle controller area network bus 148 to determine if regenerative kinetic braking would increase or enhance a wheel slippage condition if regenerative braking were initiated. Transmission controller 27 selects gears for transmission 154 in response to these signals. Hydraulic hybrid controller 150 operates cooperatively with brake system and anti-lock brake system controller 28 for blending regenerative braking and non-regenerative braking. Because brake blending depends upon vehicle operating conditions, hydraulic hybrid controller 150 is connected to a yaw sensor 32 and a steering wheel position sensor 36, data from which can vary the balance of regenerative and non-regenerative braking Vehicle speed can be sourced from a conventional drive shaft tachometer or from the brake system and anti-lock brake system controller 28.

Simplified control system 216 also includes an engine controller 30 which is connected for the control and monitoring of thermal engine 12 and which operates as a conventional engine controller in a hybrid system by providing for thermal engine 12 cutoff during periods of regenerative braking or when the parallel hydraulic hybrid vehicle 211 is under hydraulic power. Engine controller 30 also monitors the position of and cycles from off to on of an ignition switch (IGN).

Figure 4:
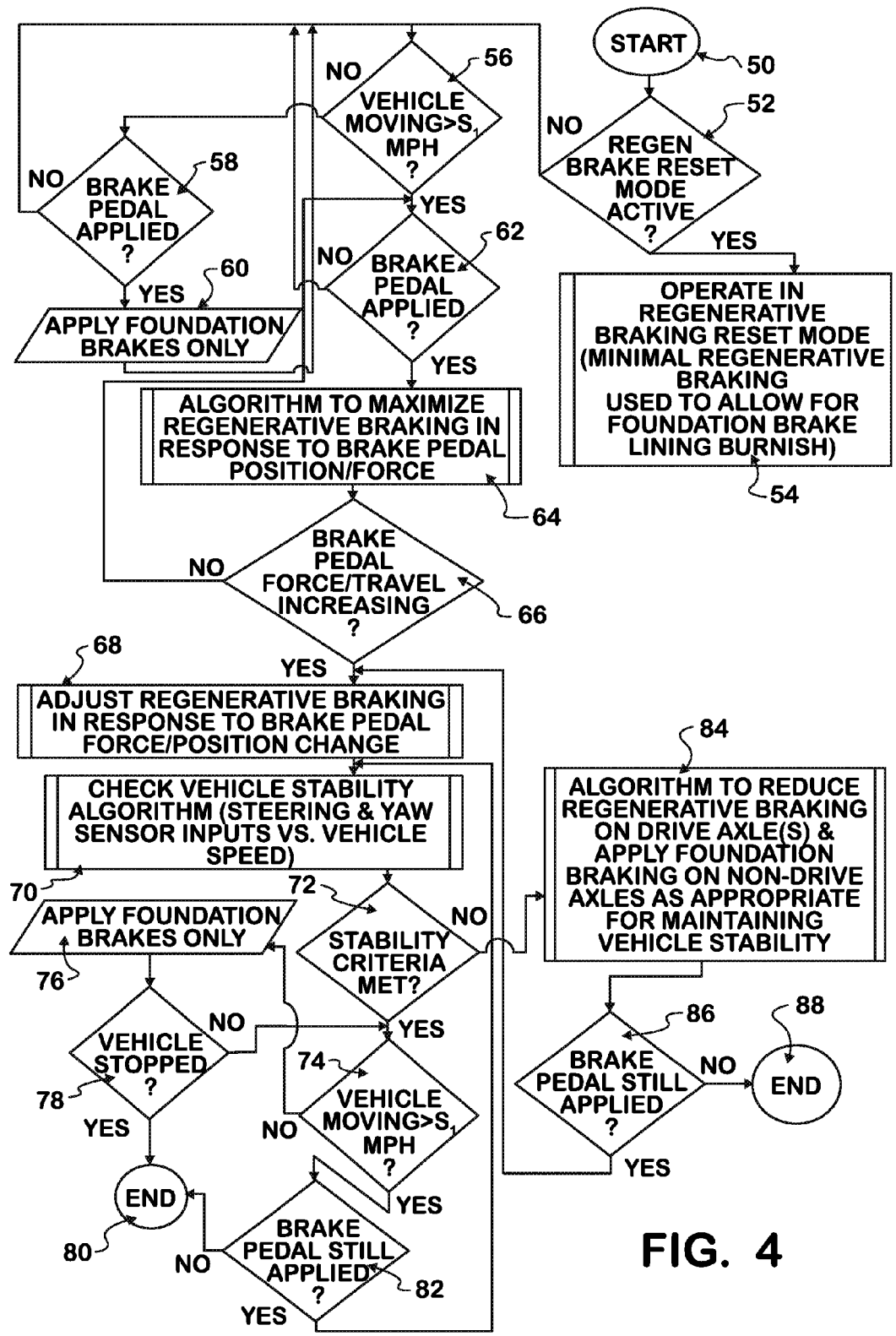
FIG. 4 is a high level flow chart for braking control on the vehicle of FIG. 1.

Referring to FIG. 4, a high level flow chart illustrates operation of the present vehicle braking system. It should be understood that a number of input and output steps relating to collecting sensor data such as measurements of vehicle speed, determining brake pedal position and adjusting brake application pressure have been omitted for the sake of simplicity in exposition. The process is entered at step 50 typically upon cycling the ignition (IGN) on. The process advances to a conditional step 52 which determines whether the vehicle 10 is in its regenerative braking reset mode or not.

Regenerative braking reset mode is the mode used for a new vehicle or a vehicle on which new brake pads and linings have just been installed and during which regenerative braking is minimized or not used at all until the vehicle has been operated long enough to assure brake burnishing. If the vehicle 10 is in the regenerative braking reset mode, the YES branch from conditional step 52 is taken to processing step 54 which indicates that the vehicle operates in regenerative braking reset mode which means, in essence, that brakes are operated as on a non-hybrid vehicle with little or no regenerative braking use.

If the vehicle is not in regenerative braking reset mode, the NO branch is followed from conditional step 52 to conditional step 56 where vehicle speed is compared to a minimum threshold speed $S_1$. If the vehicle's speed is less than the minimum threshold, the NO branch is followed to conditional step 58 where it is determined if the brake pedal has been applied (either by obtaining a measurement of its displacement or the pressure applied to it). If the brake pedal has not been applied, the NO branch is followed from conditional step 58 back to conditional step 56. If the brake pedal has been applied, then input/output (I/O) step 60 is executed to indicate application of the service brakes 24 to a degree commensurate with the degree to which the brake pedal has been displaced. Following application of the service brakes 24, the process returns to conditional step 56.

From conditional step 56, the YES branch is followed whenever vehicle speed exceeds the minimum threshold speed $S_1$. Along the YES branch processing advances to conditional step 62 where it is determined whether the brake pedal has been applied (or if a request from braking torque has been received, for example from a speed controller). If not, processing returns along the NO branch to conditional step 56 in a loop which is executed until the brake pedal is depressed. Along the YES branch, processing step 64 reflects execution of an algorithm to maximize regenerative braking in response to brake pedal displacement or force. Following processing step 64, a conditional step 66 is executed relating to whether brake pedal displacement/force is increasing. If not, the NO branch is followed back to conditional step 56 to determine if speed has fallen through the minimum threshold $S_1$. Steps 56, 62, 64 and 66 can be looped through until vehicle speed no longer exceeds the minimum threshold, the brake pedal is released or until brake pressure is reduced.

The YES branch from conditional step 66 advances processing out of the routine's first loop into its second stage at processing step 68. Processing step 68 represents adjustment of regenerative braking in response to changes in brake pedal applied force and/or displacement. Next, at processing step 70 vehicle stability criteria are checked. These include comparisons of steering wheel position and vehicle yaw against vehicle measured speed. The output of the stability algorithm is compared to an index. On rear wheel drive hybrid or electric vehicles, regenerative braking is applied to the rear wheels (the drive wheels) when the driver depresses the brake pedal just enough to slow the vehicle at a threshold rate ($<D_1$ ft/sec$^2$ with no wheel locking on any braking wheel as determined by the brake system and anti-lock brake system controller 28 and vehicle speed exceeding the minimum threshold $S_1$). Regenerative braking could also occur at the direction of a speed control device (in response to vehicle speed and slope sensors) to retard vehicle acceleration down a hill. If regenerative braking is applied in a curve, a yaw sensor and steering wheel position sensor will indicate that the vehicle is turning and will simultaneously apply an appropriate amount of non-drive wheel 22 (typically front) foundation/service braking to maintain good vehicle stability. The amount of non-drive wheel 22 foundation/service braking applied is determined by the amount of vehicle yaw, steering wheel input and vehicle speed by using a look-up table. If braking demand exceeds what can be exerted through regenerative braking, foundation braking is added to both drive and non-drive axles.

Following processing step 70, a conditional step 72 is provided which determines if stability criteria are being met. If not, the NO branch is followed to processing step 84 where an algorithm is executed which reduces the amount of regenerative braking and proportionally increases foundation/service braking to make up for the loss of regenerative braking. This occurs first on the non-regenerative wheels 22 but may include service brakes 24 for the regenerative wheels 20. Next, conditional step 86 is executed to determine if the brake pedal remains applied. If not, the process is discontinued along exit/end path 88. If the brake pedal is still displaced, processing returns to processing step 68.

Returning to conditional step 72, the YES branch is followed when stability criteria are met. Along this path a conditional step 74 is used to determine if vehicle still exceeds the minimum threshold speed of $S_1$. If not, regenerative braking is not used and the process follows the NO path to I/O step 76 where service brakes 24 solely are used to retard vehicle 10 motion. Next, control is passed to conditional step 78 where it is determined if the vehicle has stopped. If YES, the process is exited through program termination box 80. If not, the NO branch leads control back to conditional step 74 for another comparison involving vehicle speed and the minimum threshold speed $S_1$ for regenerative braking Along the YES branch from conditional step 74, control is passed to conditional step 82 where it is determined if the brake pedal is still applied. If not, the process terminates and if yes, the process returns control to processing step 68.

Figure 5:
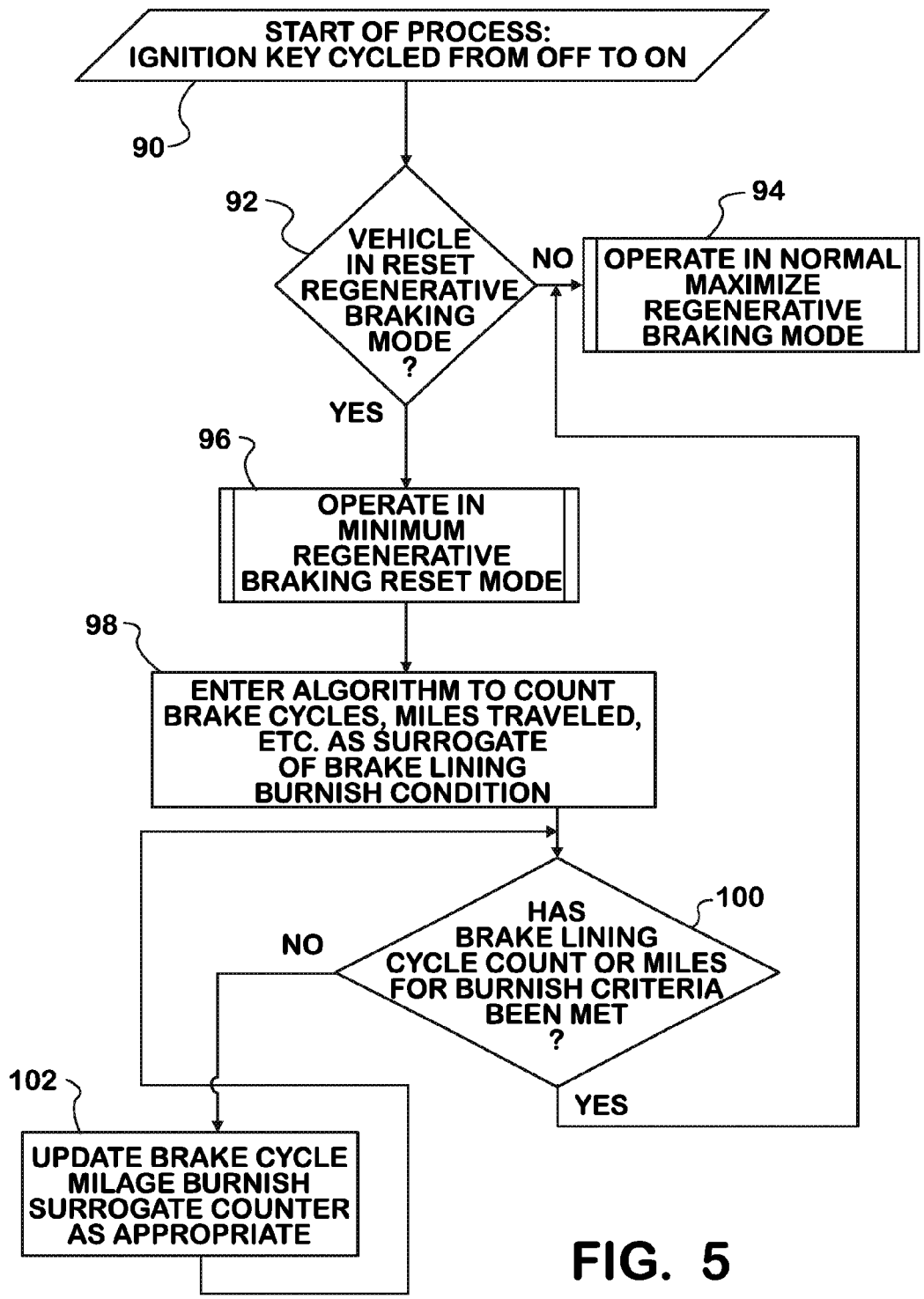
FIG. 5 is a subroutine for the high level flow chart for braking control of the vehicle of FIG. 2.

Turning to FIG. 5, a procedure for handling duration of the brake burnishing period, or reset regenerative braking mode, is illustrated. The process begins with the ignition key being cycled from OFF to ON at I/O step 90 followed by a conditional step 92 where it is determined if the vehicle 10 is in the reset regenerative braking mode. If not, the NO branch is taken to normal "maximize regenerative braking" mode processing step 94. Along the YES branch from conditional step 92, a processing step 96 is provided indicating operation with minimum regenerative braking. This includes using no regenerative braking. Next, control passes to an algorithm which measures the metric(s) used to determine duration of the reset mode such as brake cycles, miles traveled, etc., which serve as surrogates for service brake 24 pad/lining burnish condition. Next, at conditional step 100 it is determined if the surrogate operating variable measured as a condition indicator for brake pad/lining burnish condition has been met. If yes, process control passes to processing step 94. If not, a loop is executed including conditional step 100 and processing step 102, which provides for updating the surrogate operating variable measurement.

Figure 6:
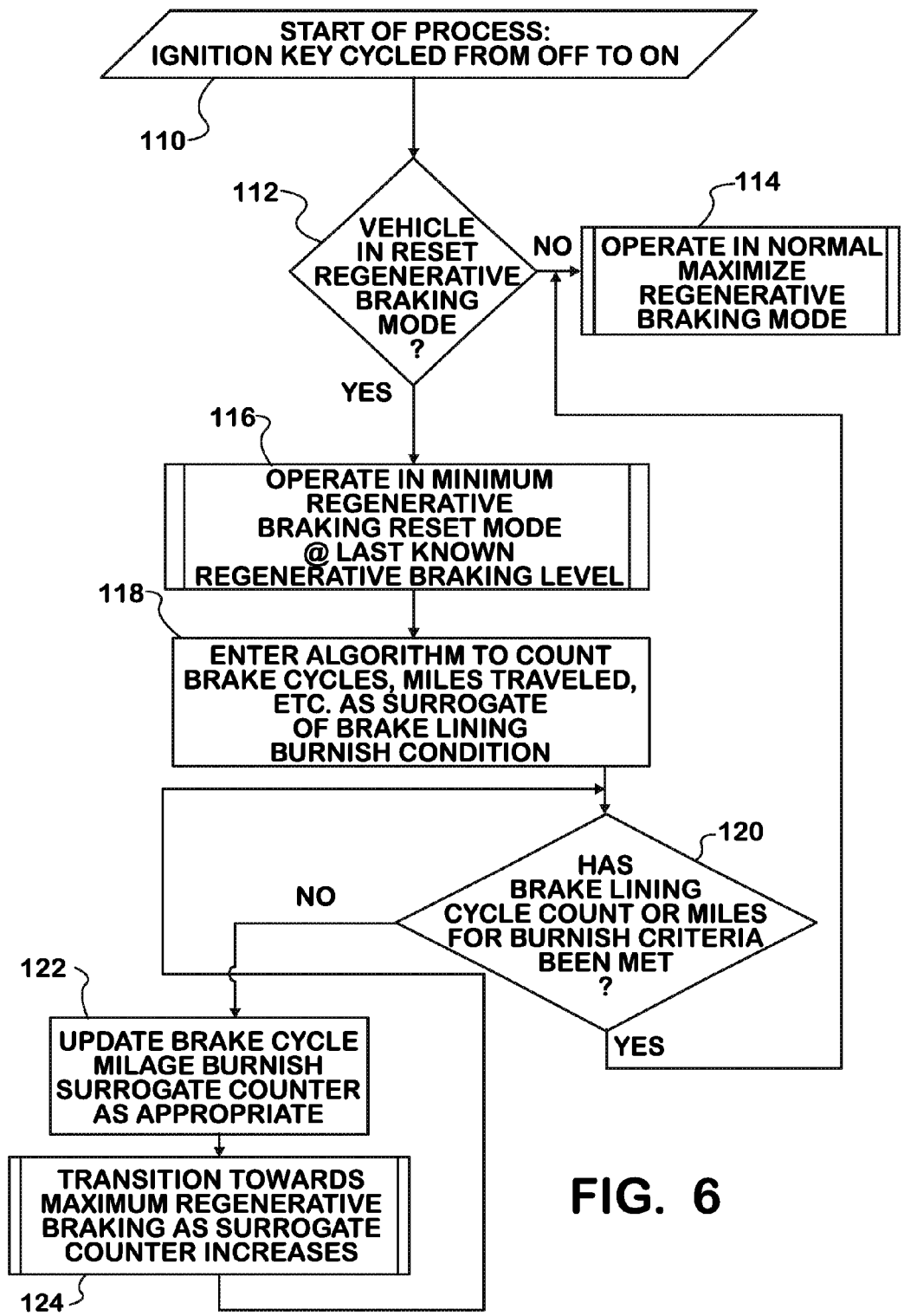
FIG. 6 is an alternative subroutine for the subroutine of FIG. 4.

FIG. 6 is an alternative procedure to FIG. 5. The process of FIG. 6 provides a gradual transition from reset regenerative braking mode to normal operation. Again, as indicated by I/O step 110, the process begins with the ignition key being cycled from OFF to ON followed by a conditional step 112 where it is determined if the vehicle 10 is in the reset regenerative braking mode. If not, the NO branch is taken to normal "maximize regenerative braking" mode processing step 114. Along the YES branch from conditional step 112, a processing step 116 is provided indicating operation with minimum regenerative braking at the last known regenerative braking level, which initially may be zero. Next, control passes to an algorithm which measures the metric(s) used to determine duration of the reset mode such as brake cycles, miles traveled, etc., which serve as surrogates for service brake 24 pad/lining burnish condition. Next, at conditional step 120 it is determined if the surrogate operating variable measured as a condition indicator for brake pad/lining burnish condition has been met. If yes, process control passes to processing step 114. If not, a loop is executed including conditional step 120 and processing step 122 and processing step 124, which provide for updating the surrogate operating variable measurement and for increasing the regenerative braking component of total braking.

Figure 7:
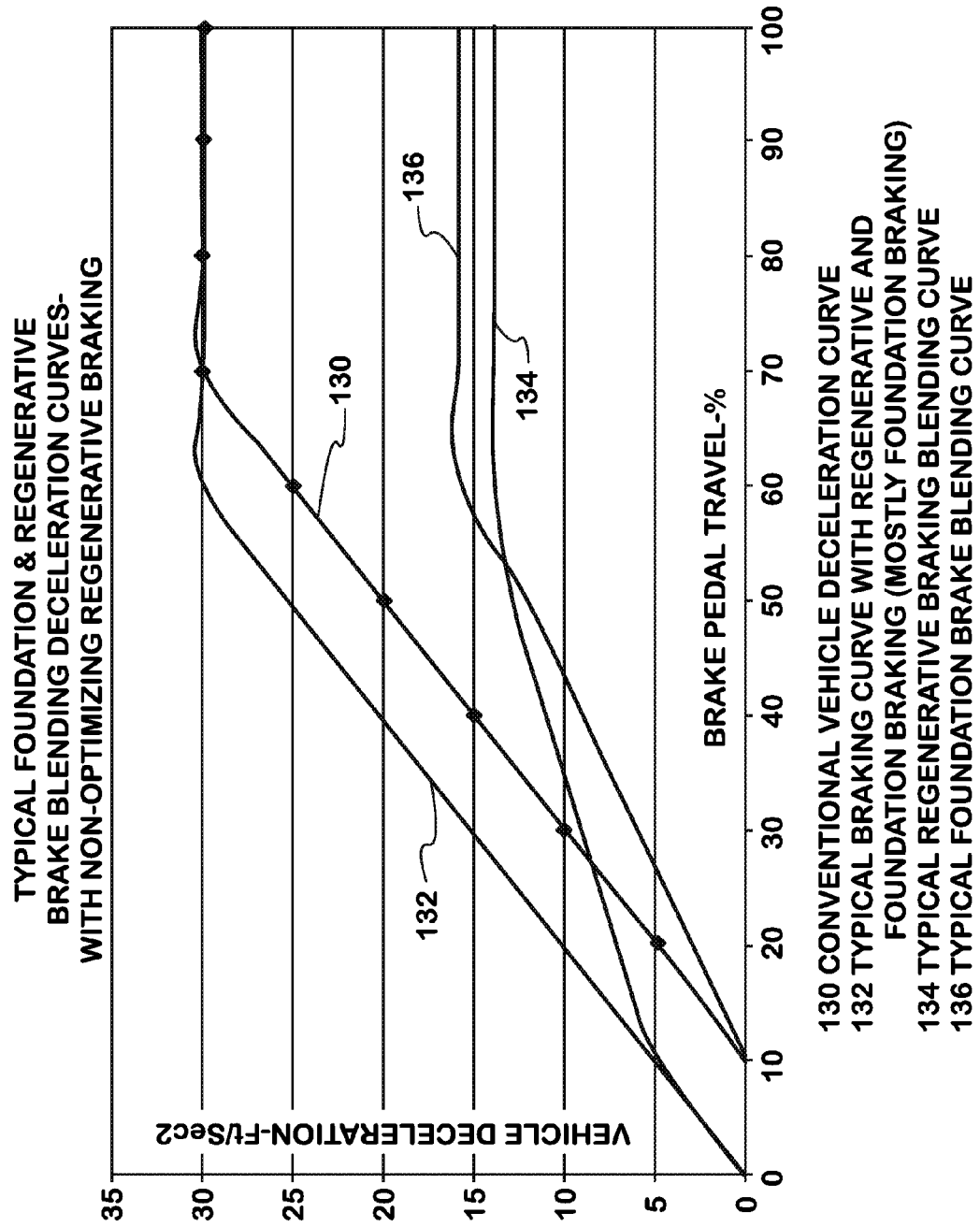
FIG. 7 is a graph.
Figure 8:
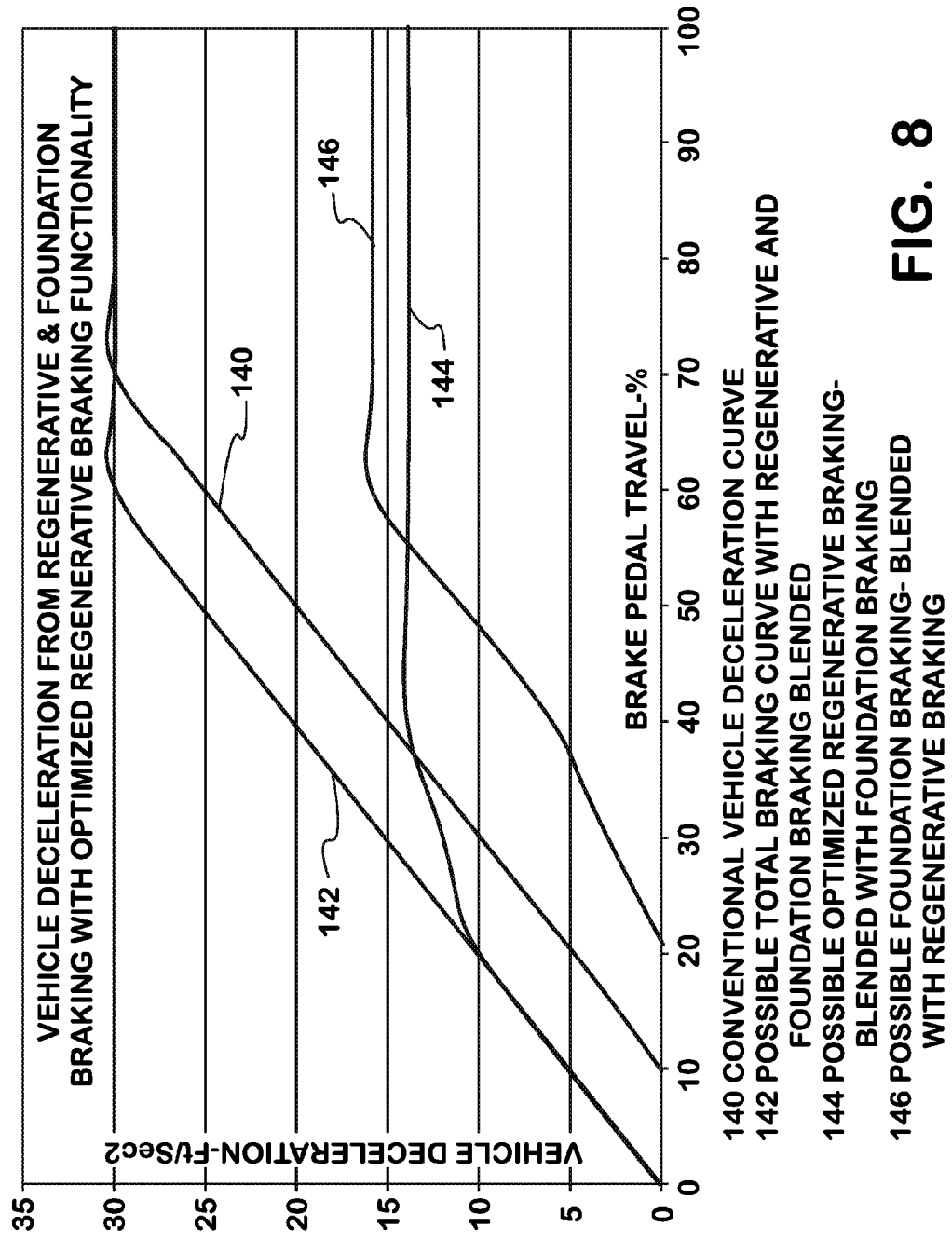
FIG. 8 is a graph.

FIGS. 7 and 8 provide a comparison between a conventional hybrid vehicle using regenerative braking and vehicle 10 which operates to increase the total kinetic energy recaptured. The vertical scale is vehicle deceleration in units of feet per second squared (on dry, smooth pavement) and the horizontal scale is percentage of total possible brake displacement. Total deceleration, that is the braking provided by both service brakes and regenerative braking is the same as indicated by curves 132 and 142. Curves 130 and 140 are conventional vehicle deceleration curves for comparison purposes. Curves 134 and 144 illustrate regenerative braking contribution between prior hybrid vehicles and the vehicle 10, respectively. The flattened portion of curves 134 and 144 reflects limits in the capacity of drive train 15 to absorb vehicle kinetic energy. Curves 136 and 146 illustrate the service brake contribution in the two systems, respectively. The service brake contribution in the present vehicle 10 is reduced, implying more energy recapture for pedal travel between about 20% and about 50% of possible displacement, provided vehicle 10 speed exceeds $S_1$. The specific percentage of pedal travel and vehicle deceleration rate are illustrative only and not intended to be limiting. Each vehicle family will entail specific calibration or tuning to increase the amount of regenerative braking obtained during deceleration events.

What is claimed is:

1. A vehicle, comprising:
   a vehicle drive train including a traction motor, at least one drive wheel and means for mechanically coupling the traction motor to the at least one drive wheel;
   the traction motor having a traction mode in which the traction motor operates as a vehicle prime mover through the at least one drive wheel and a regenerative braking mode in which the traction motor absorbs vehicle kinetic energy through the at least one drive wheel for storage;
   a vehicle speed sensor;
   service brakes connected to the at least one drive wheel;
   means for requesting calculated braking torque;
   means responsive to the means for requesting calculated braking torque and capable of allocating the calculated braking torque between the service brakes and the traction motor operating in regenerative braking mode, the means responsive to the means for requesting calculated braking torque and capable of allocating braking torque being further responsive to vehicle speed falling below a minimum speed threshold by allocating all braking torque to the service brakes and still further responsive to vehicle speed exceeding the minimum speed threshold by blending braking torque between the traction motor and the service brakes as a function of braking torque requested; and
   manual means for altering allocation of the calculated braking torque between the service brakes and the traction motor operating in regenerative braking mode to a greater proportion of application of service brakes over application of the traction motor operating in regenerative braking mode for a period of time measured by operation of the vehicle.

2. A vehicle as set forth in claim 1, the means responsive to the means for requesting calculated braking torque and capable of allocating braking torque further comprising:
   a traction motor controller for switching the traction motor between a regenerative braking mode and a traction mode;
   a brake controller for controlling application of the service brakes connected to the at least one drive wheel and the service brakes connected to an at least one nondrive wheel; and
   means for communicating data between the brake controller and the traction motor controller.

3. The vehicle as set forth in claim 2, wherein the vehicle is a hybrid electric vehicle and the vehicle drive train further includes an internal combustion engine which may be selectively mechanically coupled to the traction motor and wherein the traction motor is an electric traction motor and wherein the internal combustion engine or the electric traction motor selectively operates as the vehicle prime mover.

4. The vehicle as set forth in claim 3, wherein the brake controller and the traction motor controller are responsive to increasing demand for braking torque by adjusting braking torque from the electric traction motor.

5. The vehicle as set forth in claim 2, wherein the traction motor is a hydraulic pump.

6. The vehicle of claim 1, wherein:
   the manual means for altering allocation of the calculated braking torque between the service brakes and the traction motor operating in regenerative braking mode further eliminates application of the traction motor operating in regenerative braking mode entirely during the period of time measured by operation of the vehicle.

7. The vehicle of claim 1, wherein:
   the manual means for altering allocation of the calculated braking torque between the service brakes and the traction motor operating in regenerative braking mode further progressively increases the proportion of application of the traction motor operating in regenerative braking mode over application of service brakes during the period of time measured by operation of the vehicle.

8. The vehicle of claim 1, wherein:
   the period of time measured by operation of the vehicle further being measured in units of distance.

9. The vehicle of claim 1, wherein:
   the period of time measured by operation of the vehicle further being measured in number of brake applications.

10. The vehicle of claim 1, wherein:
    the period of time measured by operation of the vehicle further being a function of brake swept area times brake application pressure.

11. A braking system for a vehicle supported by a plurality of wheels, the braking system comprising:
    regenerative brakes coupled to a subset of the plurality of wheels for applying braking torque thereto;
    non-regenerative brakes for applying braking torque to the plurality of wheels;
    means for controlling braking torque generated by the regenerative brakes;
    the means for controlling braking torque being responsive to a demand for braking torque at less than a minimum threshold deceleration for applying the regenerative brakes to retard movement of the vehicle;

the means for controlling braking torque adding braking torque from both the regenerative brakes and the non-regenerative brakes in response to demand for braking torque to retard movement of the vehicle at greater than the minimum threshold deceleration; and manual means for altering allocation of the braking torque between the non-regenerative brakes and the regenerative brakes to a greater proportion of application of non-regenerative brakes over application of the regenerative brakes for a period of time measured by operation of the vehicle.

12. The braking system of claim 11, further comprising:
the regenerative brakes being an electric traction motor having a regeneration operational mode.

13. The braking system of claim 11, further comprising:
the regenerative brakes being a hydraulic pump.

14. The vehicle of claim 11, wherein:
the manual means for altering allocation of the braking torque between the non-regenerative brakes and the regenerative brakes further eliminates application of the regenerative brakes entirely during the period of time measured by operation of the vehicle.

15. The vehicle of claim 11, wherein:
the manual means for altering allocation of the braking torque between the non-regenerative brakes and the regenerative brakes further progressively increases the proportion of application of the regenerative brakes over application of the non-regenerative brakes during the period of time measured by operation of the vehicle.

16. The vehicle of claim 11, wherein:
the period of time measured by operation of the vehicle further being measured in units of distance.

17. The vehicle of claim 11, wherein:
the period of time measured by operation of the vehicle further being measured in number of brake applications.

18. The vehicle of claim 11, wherein:
the period of time measured by operation of the vehicle further being a function of brake swept area times brake application pressure.

19. A braking system for a vehicle supported by a plurality of wheels, the braking system comprising:
a drivetrain coupled to a subset of the plurality of wheels;
a retarding device attached to the drivetrain for applying braking torque to the subset of the plurality of wheels;
service brakes for applying braking torque to the plurality of wheels;
means for controlling braking torque generated by the retarding device;

the means for controlling braking torque being responsive to a demand for braking torque at less than a minimum threshold deceleration for applying the retarding device to retard movement of the vehicle;

the means for controlling braking torque adding braking torque from both the retarding device and the service brakes in response to demand for braking torque to retard movement of the vehicle at greater than the minimum threshold deceleration; and manual means for altering allocation of the braking torque between the service brakes and the retarding device to a greater proportion of application of the service brakes over application of the retarding device for a period of time measured by operation of the vehicle.

20. The braking system of claim 19, wherein:
the retarding device is an engine compression brake.

21. The braking system of claim 19, wherein:
the retarding device is a driveline retarder.

22. The vehicle of claim 19, wherein:
the manual means for altering allocation of the braking torque between the service brakes and the retarding device further eliminates application of the retarding device entirely during the period of time measured by operation of the vehicle.

23. The vehicle of claim 19, wherein:
the manual means for altering allocation of the braking torque between the service brakes and the retarding device further progressively increases the proportion of application of the retarding device over application of the service brakes during the period of time measured by operation of the vehicle.

24. The vehicle of claim 19, wherein:
the period of time measured by operation of the vehicle further being measured in units of distance.

25. The vehicle of claim 19, wherein:
the period of time measured by operation of the vehicle further being measured in number of brake applications.

26. The vehicle of claim 19, wherein:
the period of time measured by operation of the vehicle further being a function of brake swept area times brake application pressure.

* * * * *